United States Patent
Schubert et al.

(10) Patent No.: US 7,704,469 B2
(45) Date of Patent: Apr. 27, 2010

(54) METHOD FOR THE RECOVERY OF RUTHENIUM FROM USED RUTHENIUM OXIDE-CONTAINING CATALYSTS

(75) Inventors: Olga Schubert, Ludwigshafen (DE); Heiko Urtel, Mannheim (DE); Michael Hesse, Worms (DE); Martin Sesing, Waldsee (DE); Claus Hofmann, Mannheim (DE); Iris Kristalis, Lorsch (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 12/158,085

(22) PCT Filed: Dec. 21, 2006

(86) PCT No.: PCT/EP2006/070059

§ 371 (c)(1),
(2), (4) Date: Jun. 19, 2008

(87) PCT Pub. No.: WO2007/074129

PCT Pub. Date: Jul. 5, 2007

(65) Prior Publication Data

US 2008/0293836 A1  Nov. 27, 2008

(30) Foreign Application Priority Data

Dec. 23, 2005  (DE) ................. 10 2005 061 954

(51) Int. Cl.
*C22B 11/00* (2006.01)
(52) U.S. Cl. .......................................... 423/22; 502/24
(58) Field of Classification Search .................. 423/22; 502/24
See application file for complete search history.

(56) References Cited

U.S. PATENT DOCUMENTS

| 5,710,228 A | 1/1998 | Krause et al. |
| 2004/0030009 A1 | 2/2004 | Gugumus |
| 2004/0138350 A1 | 7/2004 | Haremza et al. |
| 2006/0263290 A1 | 11/2006 | Walsdorff et al. |
| 2008/0299032 A1* | 12/2008 | Seki ........................ 423/502 |

FOREIGN PATENT DOCUMENTS

| DE | 215 845 A1 | 11/1984 |
| DE | 42 39 437 A1 | 5/1994 |
| DE | 103 36 522 A1 | 2/2005 |
| EP | 0 304 231 A2 | 2/1989 |
| EP | 0 743 277 A1 | 11/1996 |
| EP | 1 413 599 A1 | 4/2004 |
| GB | 1046313 | 10/1966 |
| HU | 33984 | 1/1985 |
| JP | 49079394 | 7/1974 |
| JP | 58194745 | 11/1983 |
| JP | 03013531 A1 | 1/1991 |
| JP | 2001321668 | 11/2001 |
| JP | 2002194581 | 7/2002 |
| JP | 2002206122 | 7/2002 |
| WO | WO 94/12544 | 6/1994 |
| WO | WO 01/10550 A1 | 2/2001 |
| WO | WO 02/092684 A1 | 11/2002 |

OTHER PUBLICATIONS

Christian Hagelueken, "A Precious Effort" Hydrocarbon Engineering, (pp. 48-53), Jul. 2003.
Christian Hagelueken, et al., "Responsible care, precious results" Hydrocarbon Engineering, (pp. 31-36), Mar. 2004.

* cited by examiner

*Primary Examiner*—Steven Bos
(74) *Attorney, Agent, or Firm*—Oblon, Spivak, McClelland, Maier & Neustadt, L.L.P.

(57) ABSTRACT

The invention relates to a process for recovering ruthenium from a used ruthenium-comprising catalyst which comprises ruthenium as ruthenium oxide on a support material which is sparingly soluble in mineral acid, which comprises the steps:
a) the catalyst comprising ruthenium oxide is treated in a stream of hydrogen, with ruthenium oxide present on the support being reduced to metallic ruthenium;
b) the reduced catalyst from step a) comprising metallic ruthenium on the support material is treated with hydrochloric acid in the presence of an oxygen-comprising gas, with the metallic ruthenium present on the support being dissolved as ruthenium(III) chloride and being obtained as ruthenium(III) chloride solution;
c) if appropriate, the ruthenium(III) chloride solution from step b) is worked up further.

4 Claims, No Drawings

METHOD FOR THE RECOVERY OF RUTHENIUM FROM USED RUTHENIUM OXIDE-CONTAINING CATALYSTS

CROSS REFERENCE TO RELATED APPLICATION

This application is a 371 of PCT/EP06/070059, filed on Dec. 21, 2006, and claims priority to German Patent Application No. 10 2005 061 954.1, filed on Dec. 23, 2005.

The invention relates to a process for recovering ruthenium from used catalysts comprising ruthenium oxide.

In the process developed by Deacon in 1868 for the catalytic oxidation of hydrogen chloride, hydrogen chloride is oxidized by means of oxygen in an exothermic equilibrium reaction to form chlorine. EP-A 0 743 277 discloses such a process for the catalytic oxidation of hydrogen chloride, in which a ruthenium-comprising supported catalyst is used. In this process, ruthenium is applied in the form of ruthenium chloride, ruthenium oxychlorides, chlororuthenate complexes, ruthenium hydroxide, ruthenium-amine complexes or in the form of further ruthenium complexes to the support. According to GB 1,046,313, ruthenium(III) chloride on aluminum oxide is used as catalyst in a process for the catalytic oxidation of hydrogen chloride.

γ-Aluminum oxide is usually used as aluminum oxide support.

Used noble metal catalysts which comprise platinum group metals on γ-aluminum oxide as support are generally treated by hydrometallurgical processes to recover the noble metals. Here, the γ-aluminum oxide support is dissolved in sodium hydroxide solution or sulfuric acid, with the noble metal remaining as undissolved residue. This method of recovery requires a low carbon content of the used catalysts. Noble metal catalysts having a high carbon content and catalysts which comprise noble metals on insoluble supports such as α-aluminum oxide, silicon dioxide or zeolites are processed in pyrometallurgical processes to recover the noble metals. In pyrometallurgical processes, the catalyst is converted into a melt at temperatures of >1300° C. and is subsequently separated into its elemental constituents, cf. Hydrocarbon Engineering July 2003, pages 48-53, and Hydrocarbon Engineering March 2004, pages 31-36. The recovery of noble metals from used catalysts comprising noble metals by pyrometallurgical processes is complicated and expensive.

A disadvantage of the processes for the catalytic oxidation of hydrogen chloride which employ catalysts based on α-aluminum oxide is the low mechanical strength of the catalysts. This results in high attrition and fine dust formation. For this reason, noble metal catalysts comprising ruthenium on α-aluminum oxide support have recently also been used in the catalytic oxidation of hydrogen chloride. Since α-aluminum oxide is insoluble both in sodium hydroxide solution and in sulfuric acid, the recovery of ruthenium from the used catalysts comprising α-aluminum oxide by hydrometallurgical processes is ruled out.

JP 03-013531 discloses a process for recovering ruthenium from residues comprising ruthenium or ruthenium oxide. These are reacted with gaseous chlorine at high temperature to form ruthenium chloride. The volatile ruthenium chloride is subsequently passed through a barium chloride solution and collected as water-soluble $BaRuCl_5$.

JP 58-194745 discloses a process for recovering ruthenium in which ruthenium oxides present on a corrosion-resistant support are firstly reduced to metallic ruthenium and subsequently converted into soluble alkali metal ruthenates.

JP 2002-206122 relates to a process in which ruthenium is recovered from ruthenium-comprising mixed oxides which comprise further metals. The ruthenium-comprising mixed oxide is reduced, so that ruthenium and the further metals are reduced. The further metals other than ruthenium are subsequently dissolved by means of an acid treatment, with ruthenium remaining as insoluble residue and being isolated by filtration.

It is an object of the invention to provide a process for recovering ruthenium from ruthenium-comprising catalysts which comprise ruthenium in oxidic form on ceramic support materials which are sparingly soluble in mineral acids. The process should be simple to carry out and inexpensive.

The object is achieved by a process for recovering ruthenium from a used ruthenium-comprising catalyst which comprises ruthenium as ruthenium oxide on a support material which is sparingly soluble in mineral acid, which comprises the steps:

a) the catalyst comprising ruthenium oxide is treated in a stream of hydrogen, with ruthenium oxide being reduced to metallic ruthenium;

b) the reduced catalyst from step a) comprising metallic ruthenium on the sparingly soluble support material is treated with hydrochloric acid in the presence of an oxygen-comprising gas, with the metallic ruthenium present on the support being dissolved as ruthenium(III) chloride and being obtained as aqueous ruthenium(III) chloride solution;

c) if appropriate, the ruthenium(III) chloride solution from step b) is worked up further.

Suitable sparingly soluble support materials which can be treated by the process of the invention are, for example, α-aluminum oxide, silicon dioxide, titanium dioxide (rutile and anatase $TiO_2$, preferably rutile $TiO_2$), zirconium dioxide, zeolites and graphite. A preferred support is α-aluminum oxide.

The process of the invention is preferably used for recovering ruthenium from used ruthenium-comprising catalysts which have been used in the Deacon process and comprise α-aluminum oxide as support if appropriate admixed with further support materials. In general, the support consists essentially of a-aluminum oxide, but can comprise further support materials, for example graphite, silicon dioxide, titanium dioxide and/or zirconium dioxide, preferably titanium dioxide and/or zirconium dioxide. In general, this catalyst is used at a temperature of above 200° C., preferably above 350° C., in the catalytic oxidation of hydrogen chloride. The reaction temperature is generally not more than 600° C., preferably not more than 500° C.

The ruthenium-comprising catalysts which are worked up by the process of the invention are usually obtained by impregnation of the support material with aqueous solutions of ruthenium salts, with shaping of the catalyst being carried out after or preferably before impregnation of the support material. The catalysts can also be used as fluidized-bed catalysts in the form of powders having mean particle sizes from 10 to 200 μm. As fixed-bed catalysts, they are generally used in the form of shaped catalyst bodies. After impregnation, the shaped bodies or powders are usually dried and subsequently calcined at temperatures of from 100 to 400° C. in an air, nitrogen or argon atmosphere, preferably an air atmosphere. The shaped bodies or powders are preferably firstly dried at from 100 to 150° C. and subsequently calcined at from 200 to 400° C. Calcination results in formation of the oxides from the chlorides.

A particular advantage of the process of the invention for recovering ruthenium from ruthenium-comprising support catalysts is the fact that ruthenium can be recovered in the form of an aqueous ruthenium(III) chloride solution. This ruthenium(III) chloride solution can subsequently be used for renewed production of catalyst by applying it to fresh support material, followed by drying and, if appropriate, calcination of the impregnated support.

The reduction of the catalysts comprising ruthenium oxide in step a) is generally carried out in a stream of hydrogen at elevated temperature, usually at from 50 to 600° C., preferably from 100 to 300° C., particularly preferably from 140 to 250° C., for example at about 200° C. The reduction can, for example, be carried out by passing hydrogen over the used catalyst in a rotary tube furnace.

The oxidation of ruthenium in step b) is preferably effected in concentrated hydrochloric acid having a hydrogen chloride content from 20 to 37% by weight, for example about 32% by weight. The oxidation is carried out in the presence of an oxygen-comprising gas, preferably air. For example, it is possible to place the sparingly soluble support comprising metallic ruthenium in an autoclave together with concentrated hydrochloric acid and to pass air into this solution. To limit the solution volume, gaseous hydrogen chloride can additionally be passed in. The dissolution of the metallic ruthenium usually occurs at an elevated temperature of generally from 60 to 150° C., for example about 100° C.

The resulting aqueous solution comprising ruthenium(III) chloride can, if appropriate, comprise further metals in the form of their chlorides. These further metals can originate from the reactor material and have got into the catalyst as a result of abrasion (for example nickel from nickel-comprising steels) or have been comprised in the ruthenium-comprising catalyst as further active metals in addition to ruthenium. Thus, the ruthenium-comprising catalyst can comprise, for example, further noble metals selected from among palladium, platinum, osmium, iridium, copper, silver, gold and rhenium. These further metals can be partly or completely separated off by customary methods in an optional work-up step c). The suitable methods are described in Beck, Edelmetall-Taschenbuch, 2nd edition, Heidelberg: Hüthig 1995, and Winnacker-Küchler, Chemische Technologie, 4th edition, volume 4, pages 540 to 572.

The invention is illustrated by the following example.

EXAMPLE 300 g of a used catalyst comprising 2% by weight of $RuO_2$ on α-aluminum oxide as support was reduced in a stream of hydrogen at 200° C. in a rotary tube furnace for 3 hours. Here, the catalyst was firstly heated to 200° C. in a stream of nitrogen, and was then reduced in a stream of $N_2/H_2$ (5:1) for 1 hour and subsequently in pure $H_2$ for 3 hours. The reduced catalyst was dispensed under a nitrogen atmosphere into a vessel into which nitrogen was passed. The reduced catalyst was subsequently transferred under a nitrogen atmosphere into a 2000 ml stirred apparatus and 1160 g of 32% strength by weight hydrochloric acid were added. While stirring and introducing nitrogen, the mixture was heated to 100° C. The mixture was subsequently stirred at 100° C. while sparging the solution with 50 l/h of air for 24 hours. A dark red ruthenium chloride solution was obtained and this was decanted off from the residue. The support which remained as residue was washed with about 1 l of water until neutral. The support was subsequently dried at 120° C. for 16 hours and the ruthenium content of the support was determined. The determination indicated a ruthenium content of 0.20% by weight. In comparison, the used catalyst comprised 1.49% by weight of ruthenium. Thus, about 13% of the originally comprised ruthenium remained on the support.

The invention claimed is:

1. A process for recovering ruthenium from a used ruthenium-comprising catalyst which comprises ruthenium as ruthenium oxide on a support material which is sparingly soluble in mineral acid, which comprises:
   a) the catalyst comprising ruthenium oxide is treated in a stream of hydrogen, with ruthenium oxide present on the support being reduced to metallic ruthenium; and
   b) the reduced catalyst from a) comprising metallic ruthenium on the support material is treated with hydrochloric acid having a hydrogen chloride content from 20 to 37% by weight in the presence of air at a temperature of from 60 to 150° C., wherein air is passed into the hydrochloric acid, with the metallic ruthenium present on the support being dissolved as ruthenium(III) chloride and being obtained as ruthenium(III) chloride solution.

2. The process according to claim 1, wherein the sparingly soluble support material comprises a aluminum oxide.

3. The process according to claim 1, wherein the ruthenium-comprising catalyst is produced by impregnation of the sparingly soluble support with ruthenium(III) chloride solution, drying and calcination.

4. The process according to claim 3, wherein the ruthenium (III) chloride solution obtained in b) is used for producing fresh catalyst.

* * * * *